(12) United States Patent
Rahman

(10) Patent No.: US 7,630,166 B2
(45) Date of Patent: Dec. 8, 2009

(54) CONTROL FLOW INSTABILITY TO REDUCE DISK FLUTTER AND HALF FREQUENCY WHIRL

(75) Inventor: Mohamed M. Rahman, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/957,147

(22) Filed: Sep. 30, 2004

(65) Prior Publication Data

US 2005/0057850 A1    Mar. 17, 2005

Related U.S. Application Data

(62) Division of application No. 09/834,392, filed on Apr. 13, 2001, now Pat. No. 6,801,387.

(60) Provisional application No. 60/197,221, filed on Apr. 14, 2000.

(51) Int. Cl.
*G11B 5/012* (2006.01)
(52) U.S. Cl. .................................. 360/97.01
(58) Field of Classification Search ........................ None
See application file for complete search history.

(56) References Cited

U.S. PATENT DOCUMENTS

| 825,065 | A | 7/1906 | Maitre ........................ 369/280 |
| 2,631,859 | A | 3/1953 | Ellsworth .................... 369/280 |
| 4,074,330 | A | 2/1978 | Norton et al. ............... 360/224 |
| 4,546,464 | A | 10/1985 | Inoue et al. ................. 369/280 |
| 4,578,727 | A | 3/1986 | Hills ..................... 360/130.34 |
| 4,978,847 | A | 12/1990 | Fukunaga et al. ...... 250/231.14 |
| 5,128,922 | A | 7/1992 | Inui et al. ................... 369/280 |
| 5,517,372 | A | 5/1996 | Shibuya et al. ........... 360/97.02 |
| 5,696,649 | A | 12/1997 | Boutaghou ............... 360/97.03 |
| 5,909,661 | A | 6/1999 | Abramovitch et al. ...... 702/191 |
| 5,999,369 | A | 12/1999 | Shimizu et al. .......... 360/244.5 |
| 6,462,901 | B1 | 10/2002 | Tadepalli ................. 360/97.03 |

*Primary Examiner*—David D Davis
(74) *Attorney, Agent, or Firm*—David K. Lucente

(57) ABSTRACT

To reduce the whirling air vortices which are normally formed at the disc tip, the outer edge of the disc surface may be gradually thinned down to a sharp tip. An alternative approach, the disc tip is gradually reduced in width and rounded at its outer edge. A flow obstruction may be incorporated in the shroud adjacent the edge of the disc tip. This obstruction may comprise a small substantially rectangular insert extending from the inner edge of the housing. Or, the inner surface of the portion of the housing adjacent the ends of the disc may incorporate grooves therein. These grooves, which are roughly herringbone in shape, and would have their center near either the edge of disc in a single disc environment or mid-way between the disc in a two disc environment.

9 Claims, 4 Drawing Sheets

CONTROL FLOW INSTABILITY TO REDUCE DISK FLUTTER AND HALF FREQUENCY WHIRL

CROSS-REFERENCE TO RELATED APPLICATIONS

This application is a divisional application of U.S. patent application Ser. No. 09/834,392 filed Apr. 13, 2001 now U.S Pat. No. 6,801,387 entitled "Control Flow Instability to Reduce Disk Flutter and Half Frequency Whirl", which claims benefit of U.S. provisional patent application Ser. No. 60/197,221, filed Apr. 14, 2000 and entitled "Control Flow Instability to Reduce Disk Flutter and Half Frequency Whirl", both of which are hereby incorporated by reference in their entirety.

FIELD OF THE INVENTION

The present invention generally relates to disc drive apparatus, and more particularly relates to an improvement in the control of disc flutter and half frequency whirl to provide enhanced medium to transducer spacing and stabilization.

BACKGROUND OF THE INVENTION

For successful magnetic recording, particularly at high densities, such as is currently employed in high density disc drive storage apparatus, there should be a predictable constant space in between a record medium and a transducer which is used to access the record medium for a wide range of operating parameters. Such spacing has a substantial effect, particularly at high densities on fringing flux patterns such that the resolution of the sensing and recording on a record medium is significantly affected. Unfortunately, the interaction of many parameters, especially with the thin, closely spaced discs, which are in use today, have a substantial effect on the predictability and maintainability on such desired constant spacing. Such parameters include the relative speed between the record medium and the transducer, and the interior of the surface areas surrounding the transducer, and disc storage substrate parameters, such as flexibility and thickness. In addition, given the very tight spacing margins in present use between a transducer and the medium, even temperature and humidity can have a significant effect on variations in medium to transducer spacing.

Prior attempts to solve this problem have been both complex, expensive, and space-consuming. For example, in U.S. Pat. No. 3,178,719, a flexible magnetic disc is mounted in close proximity to a flat air bearing surface of an annular plate referred to as a Bernoulli plate and is rotated at a relatively fast speed causing the disc to assume a stable position. A number of magnetic heads are included in the plate, and a partial vacuum forms around small areas of the disc around the magnetic heads by a vacuum pump which is included. Obviously, this is a complex and expensive approach. A simpler apparatus includes a Bernoulli plate with a groove which is open to the disk and is readily disposed along the disc; convex surfaces are located on either side of a head, generating a pull-down force on the disc in the region near the groove. Once again, this is an expensive approach requiring considerable investment in additional parts.

A more recent approach in U.S. Pat. No. 4,578,727 describes a contact type recording apparatus in which a flat air bearing surface surrounds an elongate opening to a negative pressure cavity with the record and playback head arranged in the cavity. The use of the cavity will help to stabilize the disc surface at least when it is immediately adjacent to the transducer which is to access the data on the disc. As with the other approaches, this one consumes valuable vertical space.

Thus the problem of eliminating flow instability in a high speed rotating disc continues to need a solution.

SUMMARY OF THE INVENTION

The present invention relates to a device for stabilizing media for use in a hard disc drive during high speed rotation. More specifically, the present invention relates to disc media having a high speed rate of rotation in which means are introduced defined on the inner surface of the housing for adding stability to the disc and more specifically to the outer edge of the disc. Alternatively, to achieve these goals, the design of the disc may be modified.

In accordance with the present invention, at least in one embodiment, the outer edge of the disc surface is gradually thinned down to a sharp tip. In this way, the whirling air vortices which are normally formed at the disc tip are broken up or diminished. An alternative approach, the disc tip is gradually reduced in width and rounded at its outer edge, which also has beneficial results in terms of breaking up or diminishing the vortices of air which would otherwise cause instability of the disc.

In a further alternative embodiment of the invention, a flow obstruction is incorporated in the shroud adjacent the edge of the disc tip. This obstruction may comprise a small substantially rectangular insert extending from the inner edge of the housing, intermittently around the shroud circumference typically adjacent the edge of the disc tip where one of the vortices would normally be formed. The presence of this insert would tend to eliminate or prevent the formation of this air vortex or break the bigger vortices into smaller and local ones. This insert may further be used in combination with either a disc of normal thickness or a disc having a rounded or tapered edge as described above.

In yet another approach or embodiment of the invention, the inner surface of the housing, and more specifically the portion of the housing adjacent the ends of the disc which is also referred to as the shroud, incorporate grooves therein. These grooves which are roughly herringbone in shape, and would have their center near either the edge of disc in a single disc environment or mid-way between the disc in a two disc environment and would tend to channel the air away from the region where the whirling air vortex would normally be formed. This approach would also result in diminishing or eliminating the presence of the whirling air vortex.

Other features and advantages of this invention will become apparent to a person of skill in the art who studies the present invention disclosure given with respect to the following drawings wherein.

DETAILED DESCRIPTION OF THE PREFERRED EMBODIMENT

Figure 1:
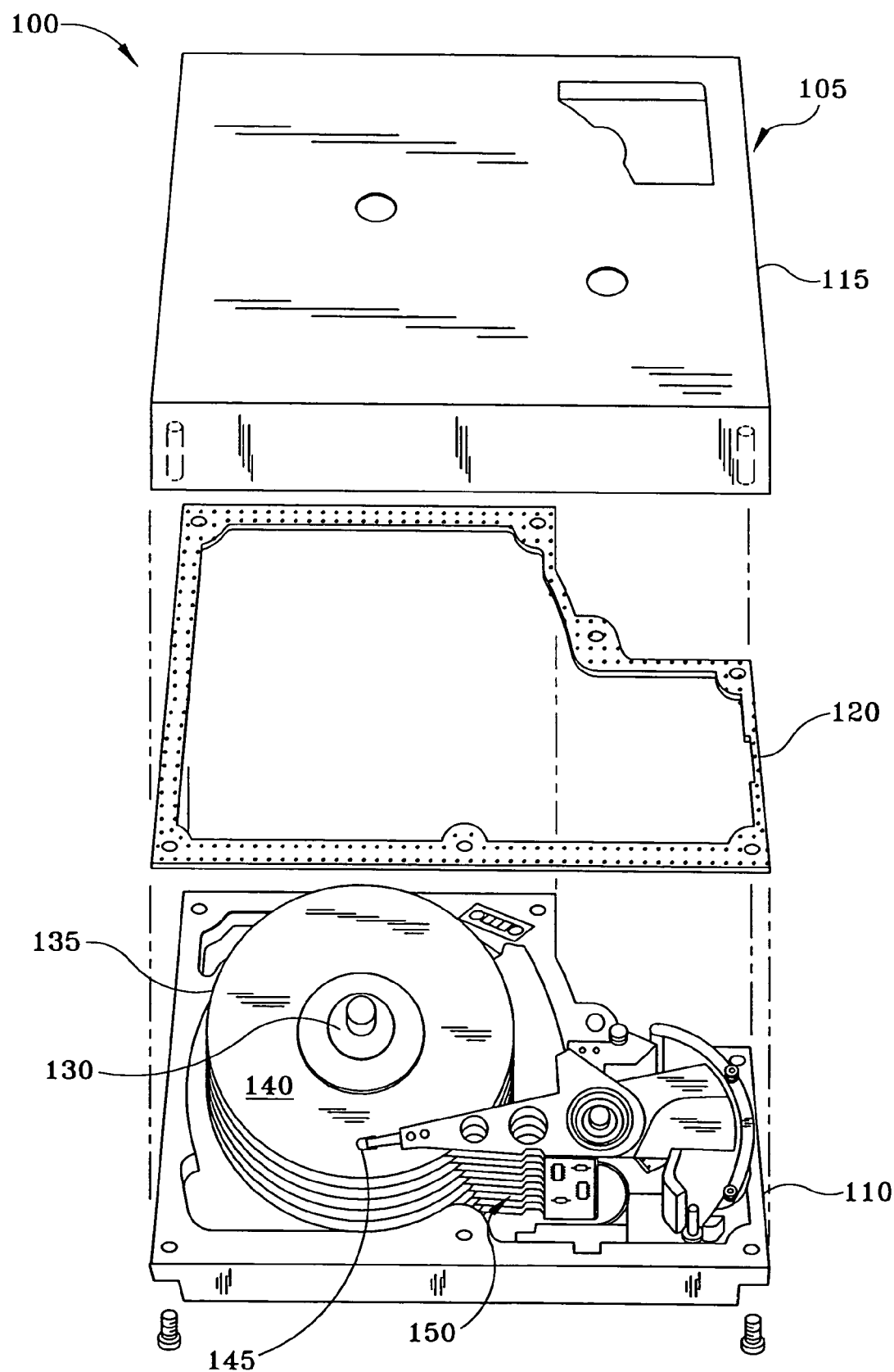
FIG. 1 is an exploded perspective view of a magnetic disc drawing in which the present invention is useful.

FIG. 1 is an exploded perspective view of a magnetic disc drive storage system in which the modifications to the disc and/or housing to control flow instability would be useful. Clearly, the invention herein is not useful solely with the disc drive design which is shown in FIG. 1, but in almost any disc drive design.

In particular disc drive examples shown here, the storage system 100 includes a housing base 110 having a spindle motor 130 which carries one or more storage discs 140. An actuator assembly 158 moves transducers 145 across the surface of the discs 140. The environment of the disc or discs 140 is sealed by seal 120 and cover 115. In operation, disc 140 rotate at high speed, while transducers 145 are positioned at any one of a large number of radially differentiated tracks on the surface of disc 140. This allows the transducers 145 to read and write magnetically coded information on the surface of the disc 140 at selected locations. In order to achieve the design goals for such present day disc drives as are shown in FIG. 1, it is necessary to be able to reliably fly the transducer extremely to the surface of the disc on a long-term basis. To do this' requires that a mechanism be provided to control the flow instability which occurs in a disc drive to reduce disc flutter and half frequency whirl.

Figure 2:
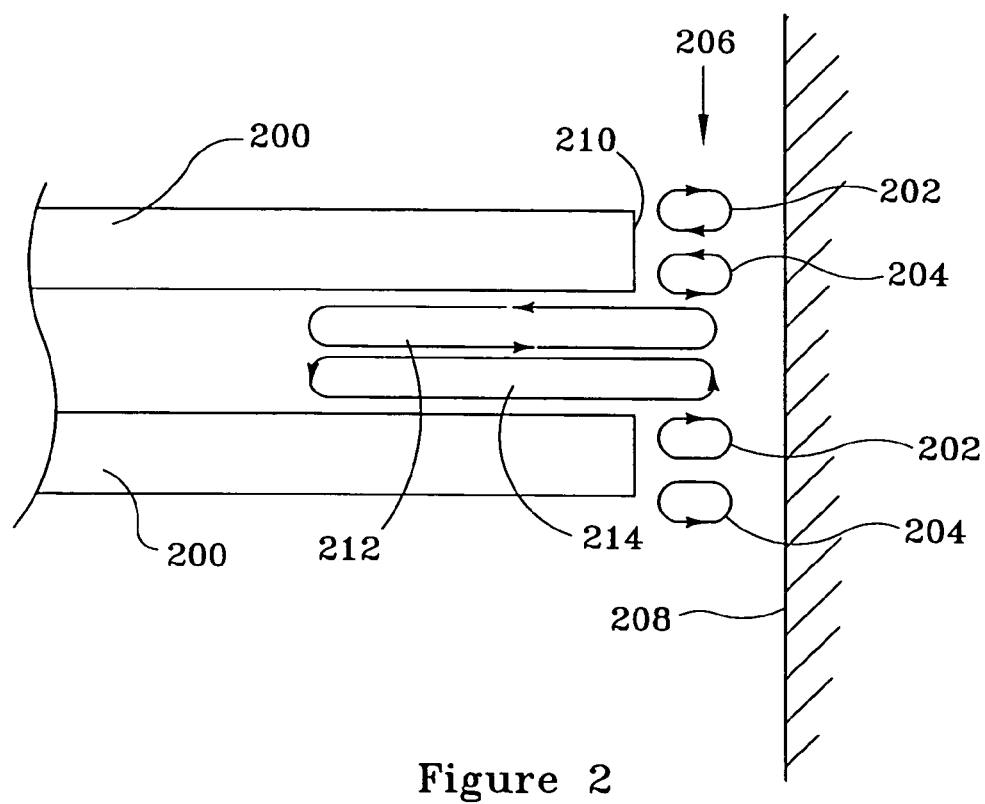
FIG. 2 is a figure illustrating the manner in which more or more whirling vortexes of air are formed near the tips of discs in a normal disc drive causing fluttering or instability of the discs.

It has been found by analysis of rotating high speed discs that the finite width of the media 200, such as shown in FIG. 2, results or is the source of what is called flow instability. Flow analysis in a disc drive which uses discs 200 of a finite width shows that as each disc rotates, two counter rotating vortices 202, 204 are formed adjacent each tip. The size and shape of these vortices 202, 204 also depends on the gap 206 between the disc tip and the shroud 208 (which in fact is the end wall of the housing 115 shown in FIG. 1). Near the periphery 210 of the disc 200, two more larger vortices 212, 214 are also seen to form adjacent one another between the discs. These two bigger and stronger vortices interact with the smaller vortices that form 202, 204 that form at the disc tip. This interaction process causes unsteadiness in the flow. As a result, the pressure changes with time adjacent the end of the disc, causing disc flutter. It has also been concluded by the inventor that this cyclic interaction has the period of two disc resolutions. From this it is believed that the interaction process is responsible for the higher end nonrepeatable runout (NRRO) at half frequency whirl and some at higher nodes as well. In the following figures and discussion, a number of solutions to eliminate the flow instability from the above-mentioned interaction process are proposed.

Figure 3A:
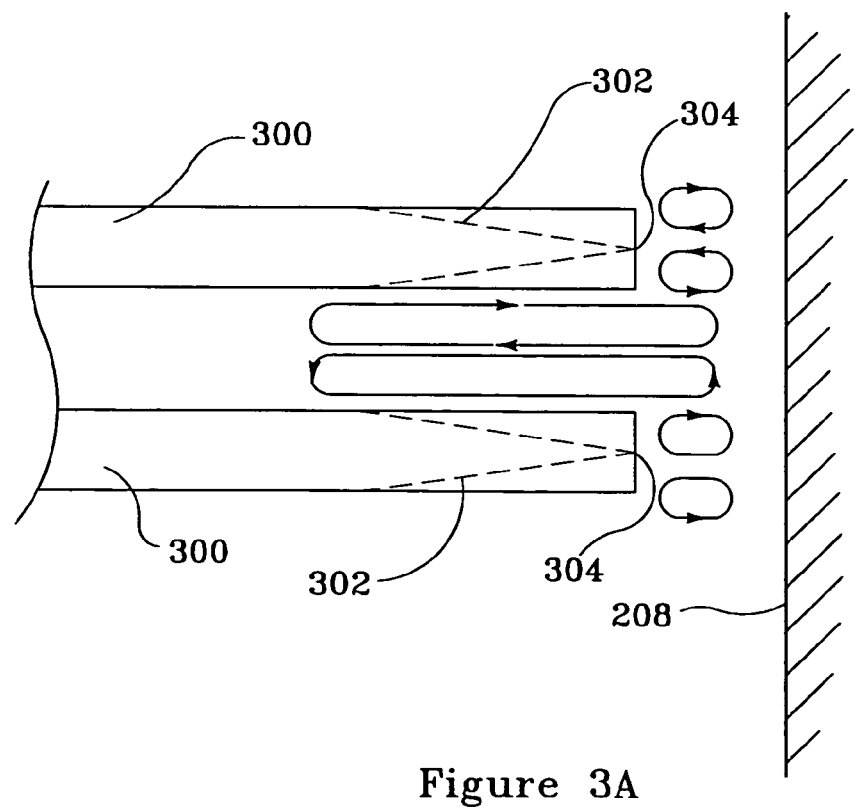
FIGS. 3A and 3B illustrate alternative approaches incorporating exemplary embodiments of the present invention modifying the disc design.

Thus referring, for example, to FIG. 3A, the discs 300 are each shown in this case with a gradually reduced width as indicated by the dashed lines 302. In a preferred form, the disc would taper down to a sharp tip 304 at its end. It is immediately evident that this would substantially reduce if not eliminate the generation of the counter-rotating vortices 202, 204 which appear in FIG. 2. It would also reduce the generation of or move the vortices 212, 214 back toward the center of the disc, away from the shroud. In this way, the disc would be substantially stabilized.

Figure 3B:
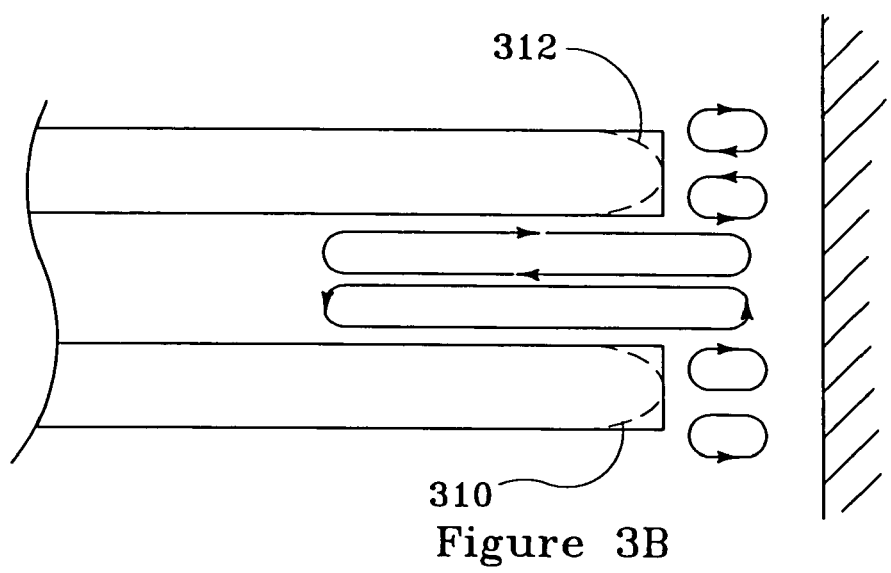

In an alternative approach, rather than tapering the disc to a sharp tip, it may be simply rounded at its end, as indicated in FIG. 3B by the dashed lines 310, 312. This would be especially effective in reducing the size and effectiveness of the rotating vortices 202, 204. Further, there would not be nearly as much of the tip width of the disc width which is effective for recording data lost. However, in both cases, although some region at the end of the disc may be lost for data recording, in many instances this region is not recorded in any event. Further, the increased stability due to diminished disc flutter and half frequency whirl by the elimination of these whirling vortices would be effective in allowing for closer packing of the data recording tracks which in fact are found on the disc surface.

Figure 3C:
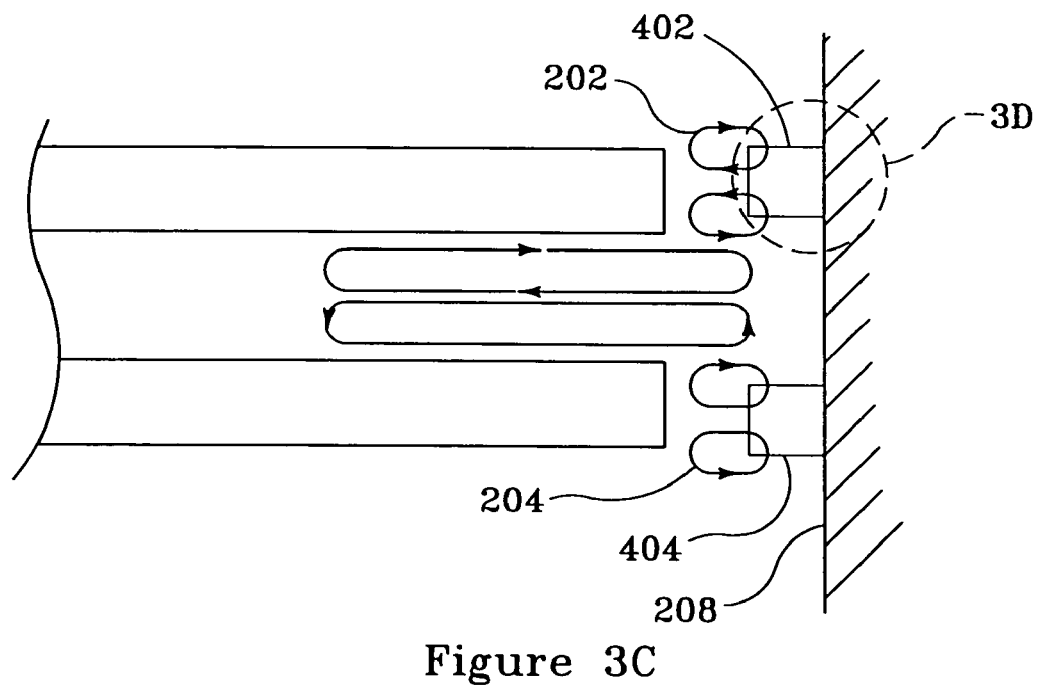
FIGS. 3C and 3D are side and end views of an alternative embodiment modifying the design of the shroud or housing.
Figure 3D:

FIG. 3C illustrates a more aggressive approach to breaking up the whirling vortices at the disc tip. In this approach, an obstruction 402, 404 is mounted on the inner surface of the shroud 208. The obstruction comprises an intermittent series of inserts 402A, 402B intermittently spaced around the periphery of the disc which intrude into the space between the end of the disc 200 and the inner surface of the shroud adjacent the outer end of each disc, as shown in FIG. 3D. By intruding into this space, the vortex 202, 204 is broken up or not allowed to form. In this way, even though it is perhaps going to occur that the overall width of the disc must be reduced, the effective width of the disc is enhanced by virtue of the fact that the disc flutter and half frequency whirl is diminished.

Figure 3E:
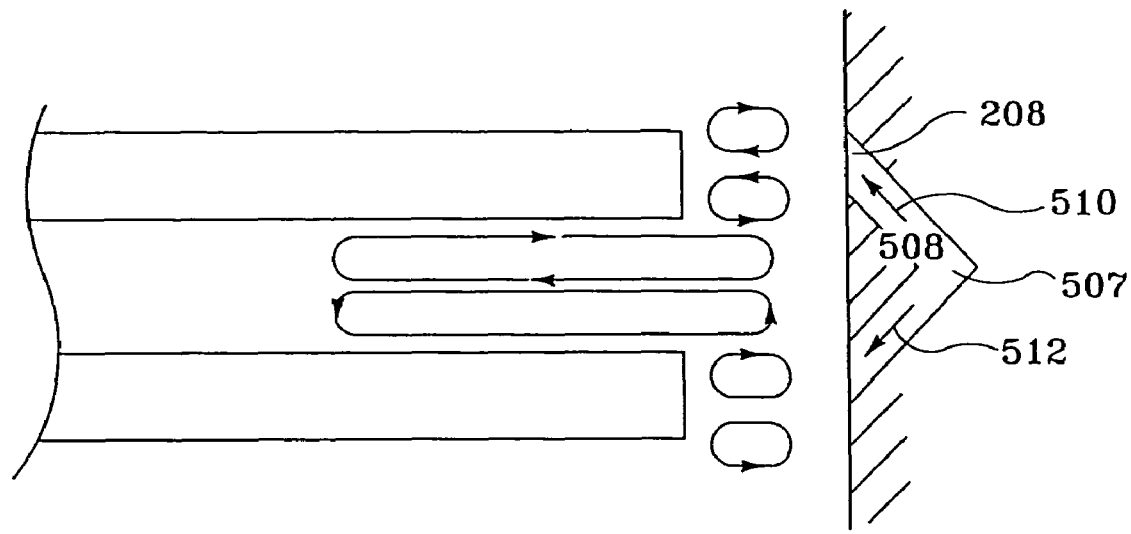
FIGS. 3E and 3F illustrate further alternative embodiments.

In yet another approach shown in FIG. 3E, grooves 500 which are preferably of a roughly herringbone shape are imposed or defined on the inner surface of the shroud 208. These grooves, which have their center near the center region 508 between the two discs, tend to channel the air which is otherwise caused to form into the rotating vortices 202, 204 away from the end points of the discs, as shown by the arrows 510, 512. Technology for forming such grooves, which must have a finite width but can be relatively shallow, exist by virtue of the work done in forming grooves for hydrodynamic bearings. It would simply be necessary to adapt such groove forming technology which may be either mechanically done or found by electrochemical machining, to impose these grooves 507 on the inner surface of the shroud.

Figure 3F:
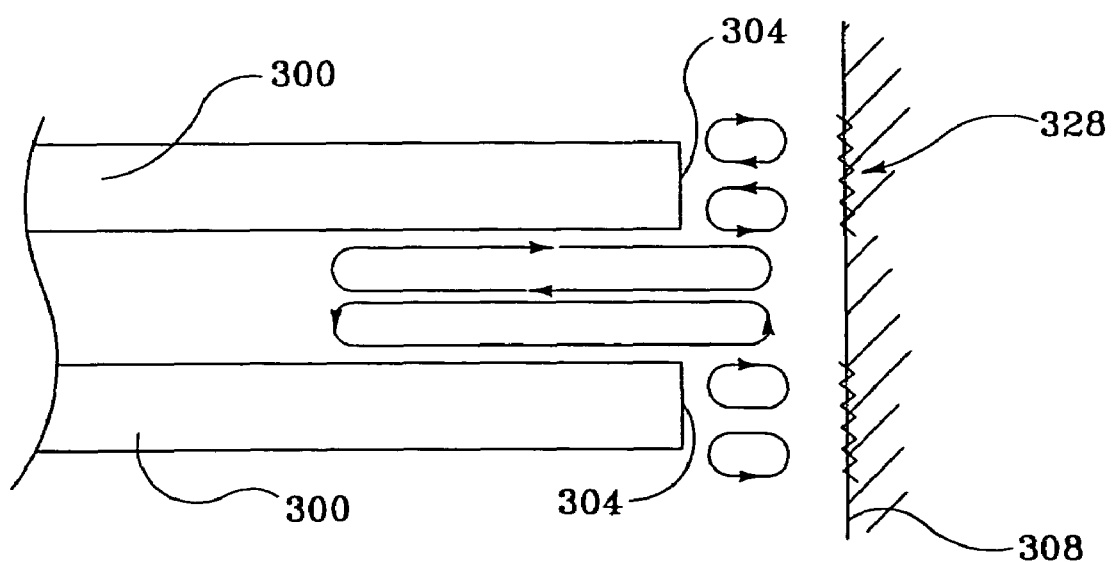

Other approaches to solving the problem of control flow instability and half frequency whirl identified herein and to which various solutions are proposed may occur to a person of skill in the art who studies the above invention disclosure. Another approach could be by roughening the shroud surface so that flow close to the shroud is turbulent and forms smaller and weaker vortices. Roughening the surface would disallow formation of well-defined, stronger and finite sized vortices such as 212, 214 shown in FIG. 1. Such roughening could be done in narrow bands adjacent the end of the disc as shown in FIG. 3F. The discs 300 set of vortices 304 as shown. By defining narrow bands 328 of roughened surface region adjacent each disc end, the vortices can be broken up or diminished. In another alternative to the approach of FIGS. 3A and 3B, the radial outer end of the disc could have an airfoil shape, since the disc rotates in a single direction, with the thinnest part being the trailing edge of the disc. Given the limitations of disc capacity, disc speed and the expense to be incurred in adopting any of these solutions, one or more of these solutions may be preferable or one or more may be used in combination to achieve the goal of stabilizing the disc and allowing the transducer to fly closer to the surface of the disc. Therefore, the scope of the present invention is to be limited only by the following claims.

The invention claimed is:

1. A disc drive storage system comprising at least two rotating magnetic discs cooperating with a spindle motor supported from a base which supports and rotates the discs, the disc drive further comprising an actuator comprising an actuator assembly for supporting and positioning a transducer adjacent at least one surface of at least one of the discs, the disc drive assembly supported within a housing comprising a base, a cover, and a shroud which is at the radial end of the discs and spaced from the radial end of the discs, a radial end of at least one of the discs being tapered to diminish the counter rotating vortices, wherein a tip width which is effective for recording of said at least one of the discs gradually decreases in width to a sharp tip.

2. A disc drive as claimed in claim 1 wherein counter rotating vortices are moved toward the center of at least one of the discs.

3. A disc drive as claimed in claim 1 wherein at least one of the discs is stabilized.

4. A disc drive as claimed in claim 1, wherein packing of data recording tracks on at least one of the discs is closer as compared to packing data recording tracks on a disc with an un-tapered radial end.

5. A disc drive as claimed in claim 1, further comprising grooves on the inner surface that channels air away from an end of at least one of the discs.

6. A disc drive as claimed in claim 5, wherein the grooves are roughly herringbone shape.

7. A disc drive as claimed in claim 6, wherein the grooves have a center near a center region between the two discs.

8. A disc drive as claimed in claim 1, further comprising a roughened surface of a surface of the shroud.

9. A disc drive as claimed in claim 8, wherein the roughened surface is narrow bands adjacent to the end of the discs.

* * * * *